United States Patent [19]

Conroy et al.

[11] 3,971,461
[45] July 27, 1976

[54] AXIALLY COMPACT CLUTCH AND BRAKE MECHANISM

[75] Inventors: William E. Conroy, Aurora; Charles C. Ehlke, Decatur; Peter Sidles, Jr., Oswego, all of Ill.

[73] Assignee: Caterpillar Tractor Co., Peoria, Ill.

[22] Filed: Aug. 28, 1974

[21] Appl. No.: 501,240

[52] U.S. Cl. .............................. 192/18 A; 192/12 C
[51] Int. Cl.² ................... F16D 67/02; B60K 41/24
[58] Field of Search ......................... 192/12 C, 18 A

[56] References Cited
UNITED STATES PATENTS

| | | | |
|---|---|---|---|
| 3,088,552 | 5/1963 | Christenson et al. | 192/18 A X |
| 3,157,257 | 11/1964 | Root | 192/18 A |
| 3,494,450 | 2/1970 | Mankowsky et al. | 192/18 A |
| 3,614,999 | 10/1971 | Sommer | 192/18 A |
| 3,638,773 | 2/1972 | Lewis et al. | 192/18 A |
| 3,696,898 | 10/1972 | Sommer | 192/18 A |
| 3,713,517 | 1/1973 | Sommer | 192/18 A |
| 3,744,606 | 7/1973 | Bucksch | 192/18 A X |
| 3,770,085 | 11/1973 | Cottingham | 192/18 A X |
| 3,835,971 | 9/1974 | Spanke et al. | 192/18 A |
| 3,860,100 | 1/1975 | Spanke et al. | 192/18 A |

*Primary Examiner*—Samuel Scott
*Assistant Examiner*—Lance W. Chandler
*Attorney, Agent, or Firm*—Wegner, Stellman, McCord, Wiles & Wood

[57] ABSTRACT

An axially compact clutch and brake mechanism. Inner and outer concentrically mounted clutch and brake drums intermittently coupled respectively by packs of interleaved friction discs and plates are operated by a pressure plate disposed intermediate the clutch and brake disc and plate packs and responds to an annular hydraulic piston to alternately engage the clutch or engage the brake. Brake and clutch packs are axially spaced along the length of concentric input and output shafts while the piston is located radially inwardly of one of the packs and is not axially spaced therefrom so as to reduce the axial length of the assemblage. The mechanism further includes structure whereby the piston is not forced to rotate within its cylinder to thereby lengthen the life of the same.

6 Claims, 2 Drawing Figures

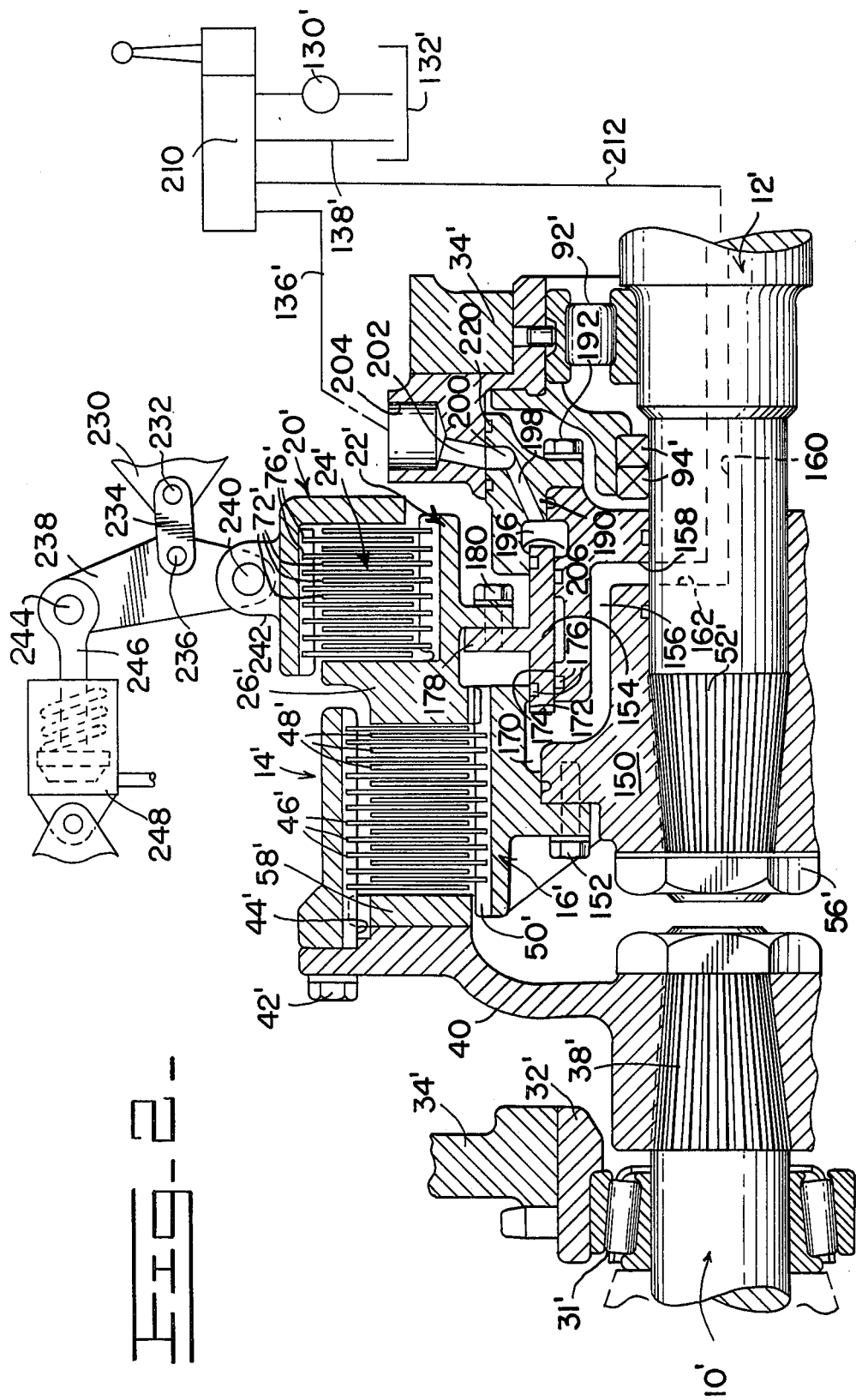

AXIALLY COMPACT CLUTCH AND BRAKE MECHANISM

BACKGROUND OF THE INVENTION

This invention relates to brake and clutch assemblies and, more specifically, to piston operated brake and clutch assemblies wherein the clutch and brake are alternately engaged. The most pertinent prior art known to the applicant includes U.S. Pat. Nos. 3,177,994 to Jewson; 3,262,525 to Ehlke et al; and 3,696,898 to Sommer.

Various types of hydraulic clutch and brake mechanisms have long been employed where intermittent drive and braking is required for satisfactory operation. For example, such combination clutch and brake mechanisms are frequently employed in saw mills, in connection with rock crushers, and other similar applications.

Perhaps a more prominent field of use of such mechanisms has been their use as combination steering clutch and brake assemblies for controlling the locomotion and direction of crawler-type tractors.

Heretofore, difficulty has been encountered in attempting to design a satisfactory clutch and brake unit. Typical problems encountered are providing such a mechanism that is easily manufactured and subsequently serviced. One frequent cause for service is the failure of actuating pistons and seals since many such units employ pistons which experience both axial and rotary movement within the bores in which they travel.

A further problem of substantial moment has been providing such a mechanism that is axially compact, that is, of minimum size from its input shaft to its output shaft.

SUMMARY OF THE INVENTION

It is the principal object of the invention to provide a new and improved combination clutch and brake mechanism. More specifically, it is an object of the invention to provide such a mechanism wherein actuating pistons are not subject to rotational as well as axial movement to prolong the life thereof and wherein the axial dimension of the assembly is minimized.

An exemplary embodiment of the invention achieves the foregoing object in a structure including a rotatable input shaft and a rotatable output shaft coaxial therewith. A first pack of clutch elements is carried by the input shaft while a second pack of clutch elements is carried by the output shaft.

In addition, a first pack of brake discs is carried by the output shaft while a second pack of brake discs is carried by stationary structure. The arrangement is such that when the packs of clutch elements are compressed against each other, the output shaft will be driven while when the packs of brake discs are compressed upon each other, the output shaft will be braked.

An actuator, mounted for axial movement relative to the shafts and is operable in one direction of movement thereof to compress the clutch elements, while being operable in another direction of movement thereof to compress the brake elements. A piston is provided for axially shifting the actuator in either of the aforementioned directions and the same is located radially inwardly with respect to the shafts of either the clutch elements or the brake elements and further is non-axially spaced from the pack of elements with respect to which it is radially inwardly located.

According to one embodiment, the piston is single-acting and the assemblage is provided with a return spring while according to another embodiment, the piston is double-acting.

Where a single-acting piston is employed, a thrust bearing interconnects the piston and the actuator so that the actuator may rotate relative to the piston and not cause the piston to rotate within the chamber in which it is received. When the piston is double-acting, it is mounted for rotation with the output shaft in such a way as to be non-rotatable within the chamber in which it is received.

According to either embodiment, it is preferred that the actuator comprise a single pressure plate sandwiched between the clutch packs and brake packs to minimize axial length of the assemblage.

Other objects and advantages will become apparent from the following specification taken in connection with the accompanying drawings.

DESCRIPTION OF THE DRAWINGS

FIG. 2 is a sectional view of another embodiment of the invention employing a double-acting piston.

DESCRIPTION OF THE PREFERRED EMBODIMENTS

Figure 1:
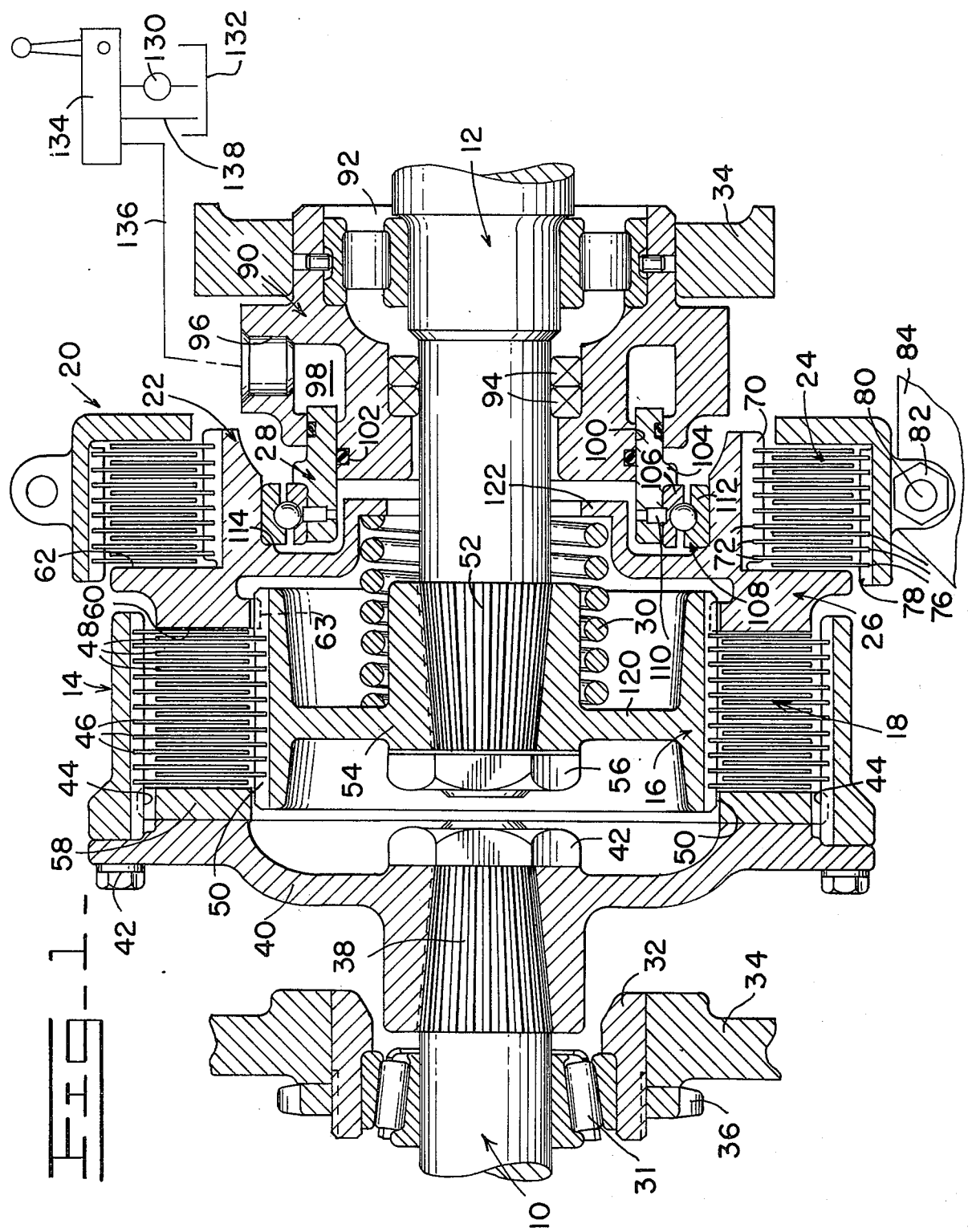
FIG. 1 is a sectional view of one embodiment of a combination brake and clutch assemblage employing a single-acting piston.

An exemplary embodiment of a brake and clutch mechanism made according to the invention employing a single-acting piston is illustrated in FIG. 1 and is seen to include an input shaft, generally designated 10, which is adapted to be driven and an output shaft, generally designated 12, which is adapted to be selectively coupled to the input shaft 10 or braked in a manner to be described more fully hereinafter.

The general organization further includes an outer clutch drum, generally designated 14, carried by the input shaft 10 and an inner clutch drum, generally designated 16, carried by the output shaft 12. A pack of clutch elements, generally designated 18, may be compressed in a manner to be described in greater detail hereinafter to couple the inner drum 16 to the outer drum 14.

In general terms, the mechanism further includes an outer, stationary brake drum, generally designated 20, which is secured by any suitable means to fixed structure and an inner brake drum, generally designated 22, carried by the output shaft 12. A pack of brake elements, generally designated 24, may be compressed to provide a braking function to brake the output shaft 12.

The general organization is completed by a reciprocal actuator, generally designated 26, which is operative to alternately press the clutch elements 18 and the brake elements 24 and which is operated by a reciprocal, single-acting piston, generally designated 28, which is operable to drive the actuator 26 in the direction of the clutch elements 18. A return spring 30 is provided for driving the actuator 26 in the direction of the brake elements 24.

Turning now to the input shaft 10, the same is journalled by any suitable bearings 31 in a sleeve 32 received within an appropriate opening in a housing 34 and retained therein by means of a nut 36. One end of the output shaft 10 is splined as at 38 to receive a hub 40 which is retained on the input shaft for rotation therewith by means of a nut 42.

The hub 40, near its radially outer extremity, mounts the outer clutch drum 14 by means of bolts 42. The outer clutch drum 14 includes a generally annular, inner surface provided with splines 44 which, in turn, slidably receive alternate ones of friction discs comprising the clutch pack 18. More specifically, a series of discs 46 are coupled to the outer clutch drum 14 for rotation therewith but may slide axially with respect thereto by reason of their engagement with the splines 44.

Interleaved with the discs 46 are friction discs 48 forming the remaining elements of the clutch pack 18. The discs 48 are slidably received on splines 50 on the cylindrical outer surface of the inner clutch drum 16 so as to be rotatable therewith and axially movable thereon.

As generally alluded to previously, the inner clutch drum 16 is carried by the output shaft 12 and, to this end, the latter includes a splined end 52 receiving the hub-like center 54 of the inner clutch drum 16. Retention is accomplished by a nut 56.

As a result of the foregoing construction, those skilled in the art will appreciate that when the clutch pack 18 and the discs 46 and 48 comprising the same are compressed against each other, the output shaft 12 will be rotationally coupled to the input shaft 10, while when there is no such compression, the input shaft 10 may continue to rotate without driving the output shaft 12.

If desired, one or more spacer plates 58 appropriately splined to the clutch components may be included.

Turning now to the actuator 26, the same is essentially a pressure plate having one pressure applying surface 60 facing the clutch pack 18 and an opposite pressure applying surface 62 facing the brake pack 24 and splined to the inner clutch drum 16 as at 63. The surfaces 60 and 62 are on opposite sides of the actuator 26 to define essentially a single pressure plate. When the actuator moves to the left as viewed in FIG. 1, the aforementioned compression of the clutch pack 18 occurs, while when moved to the right, the clutch will be disengaged and the brake engaged.

As can be seen in FIG. 1, the inner brake drum 22 is integral with the actuator 26. Like the inner clutch drum 16, the inner brake drum 22 carries radially outwardly extending splines 70 which engage brake discs 72 which rotate therewith and yet may move axially thereon. The brake discs form part of the brake pack 24 and are interleaved with the brake discs 76 and are splined by means of a splined surface 78 to the outer brake drum 20.

As generally alluded to previously, the outer brake drum 20 is fixed against rotation and, to this end, by means of bolts 80 and nuts 82, the same may be fixed in a series of peripheral locations to the stationary structure somewhat schematically indicated at 84. No reservation, however, is intended to the specific mode of attachment illustrated in FIG. 1. For example, as will be seen in connection with the embodiment illustrated in FIG. 2, it oftentimes is desirable to provide for axial adjustment of the location of the outer brake drum 20.

From the foregoing description, it will be appreciated that when the actuator 26 is moved to the right as viewed in FIG. 1, compression of the brake discs 76 and 72 upon themselves and upon the end of the stationary brake drum 20 will result in the braking of the output shaft 12. On the other hand, movement of the actuator 26 to the left will release the brake. Thus, the arrangement shown will cause alternate braking and coupling depending upon the position of the actuator 26 with respect to the clutch pack 18 and the brake pack 24.

The housing 34 includes a further opening opposite the opening receiving the input shaft 10 for mounting a cylinder structure, generally designated 90, which in turn mounts suitable bearings 92 for journalling the output shaft 12. Within the cylinder structure, seals 94 are provided to seal the interface of the cylinder structure 90 and the output shaft 12. The cylinder structure 90 may be formed of casting or the like and includes a fluid port 96 in communication with an annular chamber 98. Emerging from the chamber 98 and to the left thereof, as viewed in FIG. 1, is an annular cylinder 100 which receives one end of the piston 28. Suitable seals 102 are provided at the interface of the cylinder 100 and the piston 28.

The piston 28 is formed with an annular, radially outwardly extending flange 104 which is in engagement with the inner race 106 of a thrust bearing 108. Suitable pins 110 firmly secure the inner race 106 to the piston 28.

The outer race 112 of the thrust bearing 108 is in firm engagement with a shoulder 114 in the actuator 26 radially inwardly of the surfaces 60 and 62.

As a result of the foregoing construction, it will be appreciated that when fluid under pressure is passed through the port 96 to the chamber 98, the piston 28 will be directed to the left and such movement will be transmitted through the thrust bearing 108 to the actuator 26 to cause compression of the clutch pack 18 and relaxation of the brake pack 24. Because of the presence of the thrust bearing 108, rotational movement of the actuator 26 with the output shaft 112 will not cause rotation of the piston 28 within the cylinder 100. Thus, the piston 28 and associated seals 102 are subject to wear caused only by reciprocal movement and are not subject to wear caused by a combination of reciprocal and rotary movement within the cylinder 100.

To cause movement of the actuator 26 toward the right, as viewed in FIG. 1, when fluid under pressure is not being applied to the chamber 98, the return spring 30 is interposed between a web 120 extending between the inner clutch drum 16 and the hub 54, as well as an inwardly directed annular flange 122 forming a part of the actuator 26.

It should be observed that the configuration of the combination actuator 26 and inner brake drum 22 is such that thrust bearing 108 is located radially inwardly of the brake pack 24 and is not axially spaced therefrom. This enables the piston 28 to be similarly located, that is, radially inwardly from the brake pack 24 and not axially spaced therefrom. Consequently, the axial length of the assemblage, namely, the length from the end of the input shaft 10 to the end of the output shaft 12, is substantially reduced from prior art structures. Moreover, the unique arrangement of the piston 28 and the return spring 30 enables the use of a single piston 28 to cause alternate engagement of the clutch and brake of the invention.

Suitable manual control is also schematically illustrated in FIG. 1 in terms of a hydraulic system including a pump 130 associated with a reservoir 132 and a control valve 134. By manipulating the valve 134 so as to direct fluid under pressure from the pump 130 through a line 136 to the port 96, the clutch may be engaged and the brake disengaged. Conversely, by shifting the valve 134 so as to establish fluid communication with the reservoir 132, pressurization of the piston 26 may be relaxed, allowing the return spring to cause disengagement of the clutch and engagement of the brake.

Turning now to FIG. 2, a further embodiment of a combination brake and clutch mechanism made according to the invention is illustrated. The embodiment illustrated in FIG. 2 employs a double-acting piston with the consequence that the structure thereof differs in many respects from the structure illustrated in FIG. 1. However, for the sake of brevity, those structural components identical to or very nearly similar to those described previously in connection with the embodiment of FIG. 1 will be given like, but primed, reference numerals.

The output shaft 12' at its splined end 52' mounts an inner hub member 150 which, in turn, supports the inner clutch drum 16'. Unlike the embodiment in FIG. 1, in the embodiment in FIG. 2, the inner clutch drum 16' is separate from the inner hub 150 and is secured to the latter by means of a series of bolts 152. The purpose of this construction is to enable assembly of the mechanism to include a double-acting piston 154. More specifically, the hub 150 includes a conduit 156 having a port 158 facing the output shaft 12'. The latter, in turn, includes a central bore 160 which terminates in a radially extending segment 162 in alignment with the port 158 so that fluid under pressure may be directed through the interior of the output shaft 12' to the conduit 156.

The conduit 156 terminates in an annular chamber 170 defined in part by the hub 150 and in part by a radially inner portion of the inner clutch drum 16'.

A radially inwardly directed, annular lip 172 on the inner clutch drum 16' defines the radially outer wall of an annular cylinder receiving the piston 154 while a surface 174 on the hub 150 defines the radially inner wall of such cylinder. Suitable seals 176 are appropriately provided.

Intermediate its ends, the piston 154 includes a radially outwardly extending, peripheral flange 178 which, by a series of bolts 180, mounts the actuator 26'. A ring-like casting 190 is secured by means of a series of bolts 192 to the right-hand end of the hub 150 for rotation therewith. A formation on the casting 190 along with a formation on the right-hand end of the hub 150 define a chamber 196 adjacent the opposite end of the piston 154. The passage 198 in the casting 190 terminates in an annular, radially outwardly open recess 200 which is adapted to communicate with a conduit 202 extending to a port 204 in a stationary part of the mechanism.

A radially inwardly directed lip 206 on the casting 190 defines the opposite end of the aforementioned annular cylinder in connection with the right-hand portion of the surface 174 for receipt of the other end of the piston 154.

A valve 210 that is manually operable is employed for control purposes. Typically, the valve 210 will be a four-way valve or the like and includes a line 212 to the bore 160 as well as a line 136' to the port 204. A return line 138' to the reservoir 132' is provided and the latter is joined with a pump 130' in fluid communication with the valve 210. The arrangement is such that for one setting of the valve, fluid under pressure will be directed through the line 136' to the right-hand end of the piston 154 as viewed in FIG. 2, while the left-hand end of the piston 154 will be connected to the reservoir 132' through the line 212. This will cause the actuator 26' to shift to the left to engage the clutch.

In another position of the valve 210 fluid under pressure will be directed through the line 212 to the left-hand end of the piston 154 while the right-hand end of the piston will be connected through the line 136' to the reservoir 132' allowing disengagement of the clutch and engagement of the brake.

It will also be noted from the above-described construction, that the piston 154 does not rotate within its cylinder, both rotating together with the shaft 12.

It will also be recognized that the embodiment of FIG. 2 advantageously locates the piston 154 radially inwardly of the brake pack 24' and is non-axially spaced therefrom for the purpose of minimizing the axial length of the assemblage.

FIG. 2 also illustrates an advantageous feature that may be employed where required. More specifically, a portion of fixed structure 230, by means of a pin 232, pivotally mounts a link 234. The link 234 has its opposite end connected by a pivot pin 236 to a link 238 intermediate the ends of the latter. One end of the link 238 is connected by a pin 240 to an eye 242 on the exterior surface of the outer brake drum 20'. The opposite end of the link 238 is connected by a pivot pin 244 to the rod 246 of a single-acting cylinder 248.

In actuality, a plurality of the components 230–248, inclusive, are employed about the periphery of the outer brake drum 20'. The same serve to hold the outer brake drum 20' against rotation but allow controlled axial movement depending upon selective actuation of the cylinder 248 by a control system.

Thus, by extending the rods 246 of the cylinders 248, the outer brake drum 20' may be axially advanced towards the clutch as desired. This structure can be advantageously employed to adjust to an optimum degree, the length of axial travel of the actuator 26' between clutching and braking positions. Moreover, it provides the capability of allowing the output shaft 12' to be braked without disengagement of the clutch where such an operation is required simply by energization of the cylinder 248.

We claim:
1. An axially compact clutch and brake mechanism comprising:
   a rotatable input shaft adapted to be driven;
   a rotatable output shaft coaxial with said input shaft and adapted to be selectively driven or braked;
   a first clutch element carried by said first input shaft;
   a second clutch element aligned with said first clutch element and carried by said output shaft;
   said first and second disc-like clutch elements being mounted for relative axial movement towards and away from each other to effect a selective driving connection between said shafts;
   a first brake element carried by said output shaft;
   a second brake element aligned with said first brake element and adapted to be affixed against rotation;
   said first and second disc-like brake elements being mounted for relative movement towards and away from each other whereby said output shaft may be selectively braked;
   said first and second brake elements further being axially spaced from said first and second clutch elements;

an actuator for said clutch elements and said brake elements mounted for axial movement relative to said shafts and operable in one direction of movement thereof to engage one of said clutch elements and move the same toward the other of said clutch elements to effect the driving connection while at the same time allowing one of said brake elements to move away from the other of said brake elements to preclude braking of said output shaft, and in another direction of movement to cause the reverse to occur;

a piston for axially shifting said actuator, said piston being concentric to one of said shafts and located radially inwardly with respect to said shafts of one of said first and second clutch elements and said first and second brake elements, said piston further being non-axially spaced from said one of said first and second clutch elements and said first and second brake elements;

whereby said clutch and brake mechanism is axially compact from its input shaft to its output shaft;

and a thrust bearing interconnecting said piston and said actuator whereby said actuator may rotate relative to said piston without causing said piston to rotate.

2. The clutch and brake mechanism of claim 1 wherein said actuator includes a single pressure plate sandwiched between said first and second clutch elements and said first and second brake elements.

3. A clutch and brake mechanism according to claim 2 wherein there are plural ones of each of said first and second clutch elements and said first and second brake elements, said first clutch elements being carried by an outer clutch drum on said input shaft and said second clutch elements being carried on an inner drum on said output shaft, and wherein said first brake elements are carried by an inner drum carried by said output shaft and said second brake elements are carried by a fixed outer drum concentric with said shafts, the first and second brake elements and the first and second clutch elements being arranged on their respective drums in alternating fashion.

4. An axially compact clutch and brake mechanism comprising:
    a rotatable input shaft adapted to be driven;
    a rotatable output shaft coaxial with said input shaft and adapted to be selectively driven or braked;
    a first clutch element carried by said first input shaft;
    a second clutch element aligned with said first clutch element and carried by said output shaft;
    said first and second disc-like clutch elements being mounted for relative axial movement towards and away from each other to effect a selective driving connection between said shaft;
    a first brake element carried by said output shaft;
    a second brake element aligned with said first brake element and adapted to be affixed against rotation;
    said first and second disc-like brake elements being mounted for relative movement towards and away from each other whereby said output shaft may be selectively braked;
    said first and second brake elements further being axially spaced from said first and second clutch elements;
    an actuator for said clutch elements and said brake elements mounted for axial movement relative to said shafts and operable in one direction of movement thereof to engage one of said clutch elements and move the same toward the other of said clutch elements to effect the driving connection while at the same time allowing one of said brake elements to move away from the other of said brake elements to preclude braking of said output shaft, and in another direction of movement to cause the reverse to occur;
    a piston for axially shifting said actuator, said piston being concentric to one of said shafts and located radially inwardly with respect to said shafts of one of said first and second clutch elements and said first and second brake elements, said piston further being non-axially spaced from said one of said first and second clutch elements and said first and second brake elements;
    whereby said clutch and brake mechanism is axially compact from its input shaft to its output shaft;
    said piston being double acting; and
    a drum structure carried by said output shaft and slidably mounting said second clutch element, said drum structure further including means defining an annular bore for reciprocally receiving said piston such that said piston is rotatable with said output shaft and non-rotatable with respect to said drum structure, said piston being fixedly secured to said actuator.

5. An axially compact clutch and brake mechanism comprising:
    a rotatable input shaft adapted to be driven;
    a rotatable output shaft coaxial with said input shaft and adapted to be selectively driven or braked;
    a first clutch element carried by said first input shaft;
    a second clutch element aligned with said first clutch element and carried by said output shaft;
    said first and second disc-like clutch elements being mounted for relative axial movement towards and away from each other to effect a selective driving connection between said shafts;
    a first brake element carried by said output shaft;
    a second brake element aligned with said first brake element and adapted to be affixed against rotation;
    said first and second disc-like brake elements being mounted for relative movement towards and away from each other whereby said output shaft may be selectively braked;
    said first and second brake elements further being axially spaced from said first and second clutch elements;
    an actuator for said clutch elements and said brake elements mounted for axial movement relative to said shafts and operable in one direction of movement thereof to engage one of said clutch elements and move the same toward the other of said clutch elements to effect the driving connection while at the same time allowing one of said brake elements to preclude braking of said output shaft, and in another direction of movement to cause the reverse to occur;
    a piston for axially shifting said actuator, said piston being concentric to one of said shafts and located radially inwardly with respect to said shafts of one of said first and second clutch elements and said first and second brake elements, said piston further being non-axially spaced from said one of said first and second clutch elements and said first and second brake elements;
    whereby said clutch and brake mechanism is axially compact from its input shaft to its output shaft; and there being a plurality of each of said first and second brake elements arranged in alternating fashion, said first brake elements being carried by a drum on said output shaft; said actuator and said drum being formed as an integral unit.

6. An axially compact clutch and brake mechanism comprising:
- a rotatable input shaft adapted to be driven;
- a rotatable output shaft coaxial with said input shaft and adapted to be selectively driven or braked;
- a first clutch element aligned with said first clutch element and carried by said output shaft;
- said first and second disc-like clutch elements being mounted for relative axial movement towards and away from each other to effect a selective driving connection between said shafts;
- a first brake element carried by said output shaft;
- a second brake element aligned with said first brake element and adapted to be affixed against rotation;
- said first and second disc-like brake elements being mounted for relative movement towards and away from each other whereby said output shaft may be selectively braked;
- said first and second brake elements further being axially spaced from said first and second clutch elements;
- an actuator for said clutch elements and said brake elements mounted for axial movement relative to said shafts and operable in one direction of movement thereof to engage one of said clutch elements and move the same toward the other of said clutch elements to effect the driving connection while at the same time allowing one of said brake elements to move away from the other of said brake elements to preclude braking of said output shaft, and in another direction of movement to cause the reverse to occur;
- a piston for axially shifting said actuator, said piston being concentric to one of said shafts and located radially inwardly with respect to said shafts of one of said first and second clutch elements and said first and second brake elements, said piston further being non-axially spaced from said one of said first and second clutch elements and said first and second brake elements;
- means affixing said second brake element against rotation;
- means for selectively axially shifting said affixing means whereby selective braking may be achieved without decoupling the driving connection between the first and second clutch elements; and
- whereby said clutch and brake mechanism is axially compact from its input shaft to its output shaft.

* * * * *